May 21, 1940.  G. KRAWINKEL  2,201,587

ELECTRON DISCHARGE DEVICE SYSTEM

Filed April 21, 1937  3 Sheets-Sheet 1

INVENTOR
GÜNTHER KRAWINKEL
BY Charles McClair
ATTORNEY

May 21, 1940.   G. KRAWINKEL   2,201,587
ELECTRON DISCHARGE DEVICE SYSTEM
Filed April 21, 1937   3 Sheets-Sheet 2

INVENTOR
GÜNTHER KRAWINKEL
BY Charles McClair
ATTORNEY

May 21, 1940.  G. KRAWINKEL  2,201,587
ELECTRON DISCHARGE DEVICE SYSTEM
Filed April 21, 1937   3 Sheets-Sheet 3

INVENTOR
GÜNTHER KRAWINKEL
BY Charles McClair
ATTORNEY

Patented May 21, 1940

2,201,587

UNITED STATES PATENT OFFICE 2,201,587

ELECTRON DISCHARGE DEVICE SYSTEM

Günther Krawinkel, Berlin-Lichterfelde, Germany

Application April 21, 1937, Serial No. 138,103
In Germany April 25, 1936

13 Claims. (Cl. 250—27)

The present invention relates to a method and apparatus for voltage amplification, control of electronic currents, and electric energy storage, and is based upon the properties of a plate capable of emitting secondary electrons when under electron bombardment.

The principal object of the invention is to provide methods and apparatus of practical utility and wide application wherever free electrons strike an electrode and cause secondary electron emission.

It is known that when an insulated plate, in front of which one or more collecting electrodes are mounted, is bombarded by electrons, the plate acquires a potential which is governed by the equilibrium between the impacting electrons, the secondary electron emission at the plate, and the potential of the collecting electrode. In accordance with the present invention the plate potential is controlled by controlling or varying one or more of the factors which determine its equilibrium. For example, the control may be of factors such as the speed, or quantity, or both, of impacting electrons, of the strength of the collector field, of the space charge in the vicinity of the plate by a grid, or by a combination of any or all of these factors.

Various other objects and advantages of the invention will be apparent from the following description when read in connection with the accompanying drawings, which show diagrammatically some illustrative features and embodiments of the invention, and in which Figure 1 illustrates the fundamentals of the method;

Figure 7:
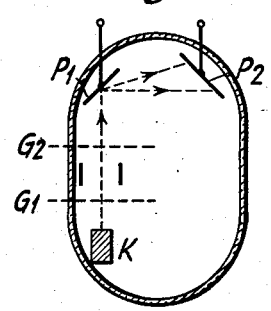
Figure 8:
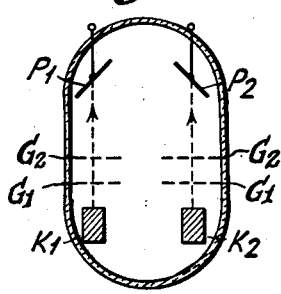
Figure 9:
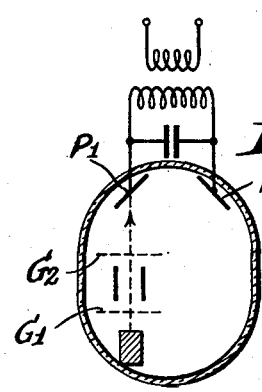
Figure 10:
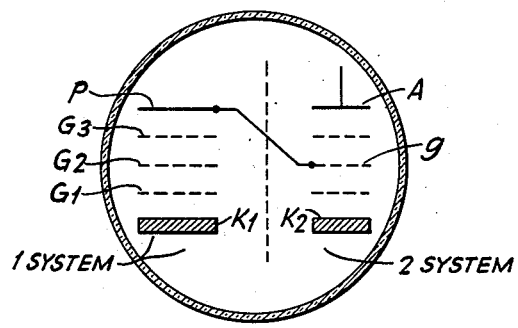
Figure 15:
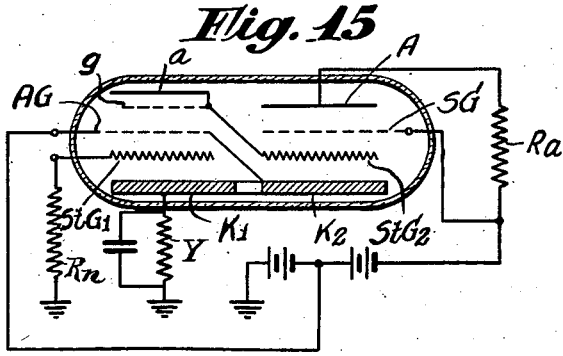
Figure 16:
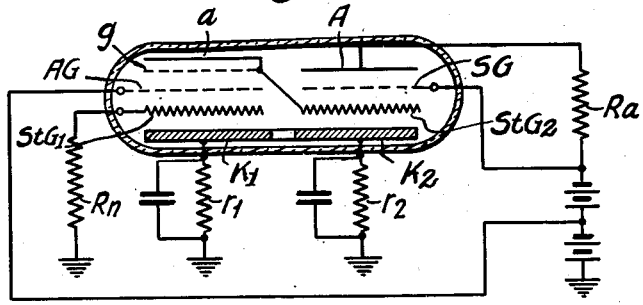
Figure 17:
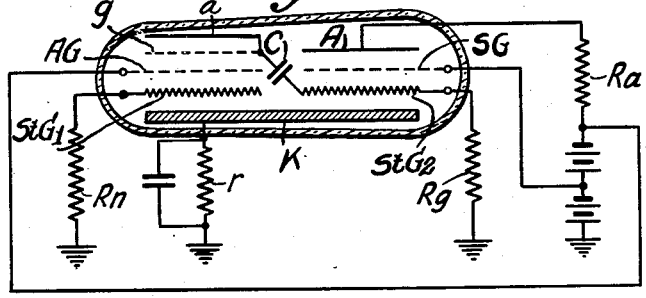
Figure 18:
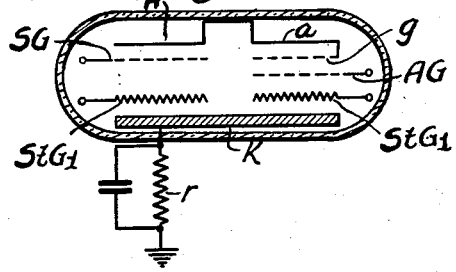

Figures 7, 8, and 9 are modifications in which secondary electrons emitted from one plate are collected by another plate;

Figure 10 is a modification in which the plate potential of one system controls the potential of a grid of another system;

Figures 11, 12, 13, and 14 are modification in which control is obtained by cooperation of one or more grids with a grid electrode which emits secondary electrons;

Figures 15, 16, and 17 are fundamental circuits adapted to tubes embodying the invention;

Figure 18 is a potential controlled screen grid system; and

Figure 19:
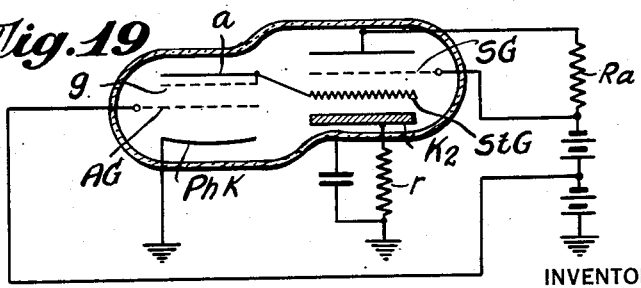

Figure 19 is a controlled screen grid system combined with a screen grid control system having a photocathode.

Figure 1:
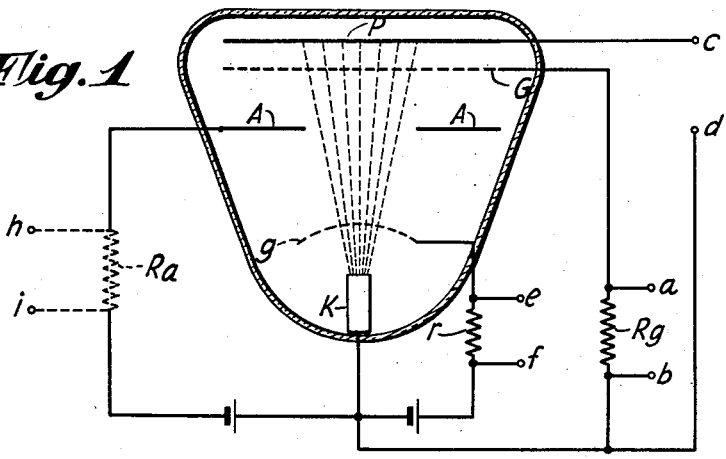

Referring to Figure 1, for one illustration of the method of the invention, a stream or jet of primary electrons from the cathode K passes through the control electrode $g$ and then impinges upon the insulated plate or target P, releasing from it a greater or less quantity of secondary electrons. The insulated target P is unconnected to any electrode in the tube and is in an open circuit outside the tube, so that it floats in an open circuit and assumes a voltage dependent on the emission of secondary electrons from it. If the velocity of the primary electron stream is low, the emission of secondary electrons will be small, and the insulated plate or target P will be practically at cathode potential. As the velocity of the primary electron steam increases the secondary emission from the plate also increases, and the released electrons are wholly or partly drawn off by a collector field which is assumed to be set up by a collecting electrode or anode A and an adjacent positive electrode, such as the grid G, which has a control action on the collector field. As the secondary emission grows greater, the insulated plate assumes a correspondingly greater positive potential. If the secondary emission is copious, the positive potential of the plate will increase to a point close to the potential of the collecting electrode or to a value which is determined by the collector field. Now in such a device, control of the potential of the insulated plate may be accomplished in various ways. For example, the plate potential may be controlled by influencing the speed or the volume of the impacting primary electron stream by the control grid $g$ or by acting upon the collector field by the electrode G, and a combination of these methods of control is feasible. By suitable arrangements, which are readily practicable, the potential variations of the plate may be made a multiple of the variations in control potential, thus realizing potential amplification or multiplication which is usable for other control actions.

A control potential is applied to a pair of terminals $a$—$b$, separated by a resistor and connected to the cathode K and electrode G and also to a pair of terminals $e$, $f$ separated by a resistor and connected to the cathode K and the control grid $g$. The amplified voltage is drawn off into an open circuit across terminals $c$—$d$, connected to the cathode K and to the plate P. This amplified open circuit voltage may be used in ways known in the prior art, as, for instance, for the grid control of a standard electron tube, for the current control of a secondary emission multiplier, or for producing the deflection of an electron beam, or for electron-optic effects. The systems upon which the control effect is to be used may be in the same envelope as the device just described, and moreover, a voltage across a resistor R. and produced by the collecting current may be taken off across terminals h—i, as shown in the art.

Since the control voltage at the electrodes G and g may be an open circuit voltage, the system is adapted to regeneration, and thus allows additional amplification or wave generation.

The cathode K, shown in Figure 1, may be thermionic, or photoelectric, a cold cathode, or may be a secondary emission cathode.

In practice it may be of advantage under certain circumstances to impress a static potential upon the insulated plate P through a semi-conductive element or a high resistance, and also to use the arrangements known in the art of electron optics.

The phenomena utilized in the invention may be used to great advantage for electric energy storage where the insulated plate acts as a condenser plate or is in the form of a myriad of minute condenser plates, as in a mosaic electrode such as is used in television devices. In such cases controlled discharge and charge, or charge and controlled discharge may be obtained by regulating the electron velocity, or the volume of the electron stream, or by control of the collector field.

The secondary electron emissivity of the insulated plate or plates may be enhanced by a suitable surface treatment, for instance by deposition of or treatment with caesium.

Figure 2:
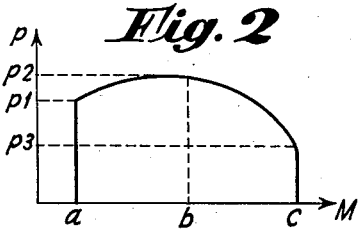
Figure 2 is a curve showing a characteristic obtainable by electron bombardment of a plate.
Figure 3:
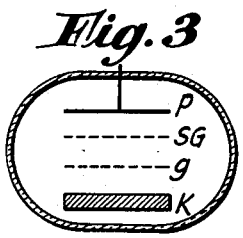
Figure 3 is a device which has the characteristic shown in Figure 2.

In order to facilitate understanding of the invention, there is shown in Figure 2 a graph of a characteristic which may be obtained by electron bombardment of an insulated plate, and which was plotted by means of a known electron tube arrangement, shown in Figure 3. The manner of plotting this graph, and the form as shown in Figure 2, may help to explain the fundamentals of the invention, without imposing any restriction on the discussed phenomena.

In Figure 3, K is a cathode, g a control grid, SG an accelerator and collector grid electrode, and P the insulated plate or target. The electrons subject to control by the grid g pass in part through the collector or grid electrode SG and strike the plate P, where they release a greater or less number of secondary electrons, which, in whole or in part, travel back to the collecting electrode SG. Incidentally and as a general rule, a space-charge will be set up between the plate P and grid electrode SG. The plate P is considered as an insulated plate, whereas the other electrodes are at the control and collector potentials, which may under certain circumstances be impressed on the electrodes through resistances. One shape of the potential of plate P plotted against the volume of the electrons under control by the electrode g of Figure 3 is shown in Figure 2, in which the quantity of electrons M is indicated by the abscissa and the plate potential P by the ordinates. Starting at the origin, the plate potential is for a time of the same value as the cathode potential. At point a of the abscissa, if the velocity of the electrons be adequate, the number of secondary electrons released at plate P will exceed the number of primary electrons which reach it. Now, since more secondary electrons leave than primary electrons arrive, the potential of the plate P grows more positive which, in turn, causes greater primary electron velocity and consequently greater secondary electron emission. As a result, the potential of P will grow further positive until a value p1 is reached. When this value is attained, a space-charge of secondary electrons begins to be built up, since as a result of increased primary electron velocity the output of secondary electrons has increased, while, at the same time, the collector field, which is dependent upon the difference of potential between the grid electrode SG and the plate P, is decreased. At first this space-charge steadies or stabilizes the rise of potential at point a of Figure 2, where it is initially unsteady, but as the volume of primary electrons increases, the potential P grows gradually greater up to the potential p2 at point b of Figure 2. The space-charge built up in front of the insulated plate P incidentally becomes increasingly more dense and, as a consequence, the rise of potential of the plate P becomes more and more slow. Beyond point b and with the increasing quantity of electrons the space-charge becomes so dense that the number of secondary electrons which migrate to the collector electrode is less than the number of primary electrons which flow to the plate, and because of the density of the space charge, there is a correspondingly more marked return of secondary electrons to the insulated plate, and the net result is a decrease in potential of the plate P. The consequence of this decrease in potential is that, on the one hand, the speed of the primary electrons is decreased, which means a reduced emission of secondary electrons, and, on the other hand, the strength of the collecting field is increased. Both of these changes or factors entail a diminution of space-charge with the result that the decrease or drop of potential of plate P with increasing volume of electrons, is stabilized or steadied up to the potential at point p3 of Figure 2. At this point the potential of the plate P has dropped to such a degree that the primary electron speed has been so diminished that the quantity of secondary electrons has fallen below the quantity of primary electrons. As a result, a sudden decrease of cathode potential occurs. While, for the sake of simplicity, all of the secondary phenomena or effects which might occur have been disregarded in the foregoing explanation, it is obvious that the plate potential may be subjected to a steady control action between the points marked a and c on the graph in Figure 2. It will be understood that such a control of the potential is feasible by action upon the volume of electrons upon the speed of the electrons, and action upon the collector field, or by a combination of these actions, the controlled plate potential being then usable for the control of electron beams, etc.

Obviously, the shape of the characteristic and thus the chances of amplification or multiplication greatly depend upon the space-charge phenomena, and the latter, in turn, are related to the secondary-electron emissivity and to the construction and arrangement of the tube. An embodiment of the invention as shown in Figure 3 in accordance with the ways and means known in the early art of electronic tube construction offers no difficulties, and since many such constructions are obvious to the man skilled in this art, no further discussion of detailed structure is required. Embodiments of the method here disclosed with multi-grid systems known in the prior art will be evident to the expert as will also the various practical uses of such schemes. It may be pointed out here that, if desired, a grid impressed with a suitable potential may be mounted between the insulated plate and the collector electrode with a view to influencing the space-charge actions. The insulated plate could also be a grid electrode behind which, for example, the collector electrode is disposed.

Figure 4:
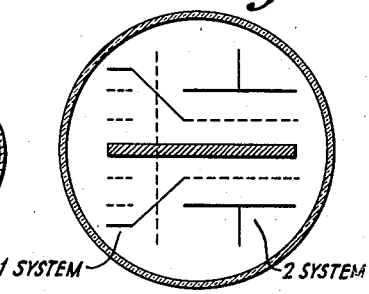
Figure 4 is a control system and a controlled system both in one envelope.

Figure 4 shows diagrammatically a device in which the system exercising the control action is enclosed in the same envelope with a system to be controlled, with a cathode common to the two systems, or with two cathodes heated conjointly or by a common heater.

Figure 5:
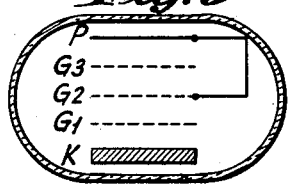
Figures 5 and 6 are modifications embodying an accelerator grid at plate potential.

A basic improvement of the method of the invention may best be understood by reference to Figure 5, in which K is a cathode, G1, G2, G3 grids, and P a collector electrode. The grid G1 is assumed, for instance, to serve for electron control, whereas grid G3 is an accelerator electrode maintained at a suitable positive potential. G2 and P, as indicated, are assumed to be connected together and to be insulated. Now, in an organization of this kind, the following conditions may be realized: The electrons which pass through all of the grids impinge upon plate P and release secondary electrons from it, causing the plate P and grid G2 to assume a positive potential. This positive potential on the plate P entails a rise in secondary electron emission from the plate P with the consequence that on the average the number of secondary electrons escaping from P is greater than the number of primary electrons impinging upon it. The difference between the electrons that are drawn off and the impinging electrons is absorbed by grid G2 from the electron current so that there will be a steady flow of electronic current through the connection between G2 and P. The electron stream controlled by grid G1, as will thus be noted, is divided at grid G2, so that part of it is absorbed by grid G2 and flows through the connection to the plate P. The balance of the electron stream passes through the grid G2, is accelerated by the grid G3, and flows in part to the plate P where it causes the release of secondary electrons; and the excess of the secondary electrons over the primary electrons is equal to the quantity of electrons drawn off by grid G2. In other words, grid G2 and plate P operate here jointly as an insulated plate.

The advantage of this method is that a much larger part of the stream of electrons participates in the change of charge on the insulated plate than is true in the method described earlier in this specification. As a matter of fact, conditions could be made so that nearly the entire stream of electrons from the cathode K takes part in the charging process by so designing the grid G2 that it will absorb almost all the primary current, while allowing only a small portion to pass through; the latter part, above G2, by the aid of secondary-emission multipliers known in the earlier art is amplified to an extent that the amplified current impacting upon plate P releases an excess of secondary-emission electrons equal to the primary current drawn off by grid G2. In the arrangement shown in Figure 5, the secondary electrons flow from plate P to the collector electrode G3, and in this case space-charge phenomena also play, or may play, a part.

Figure 6:
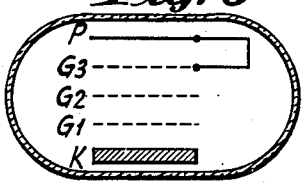

Figure 6 schematically illustrates, without an attempt to show any definite construction, arrangements such that the secondary electrons wholly or partly travel back to the current collector grid. The secondary electrons released by P are assumed to travel to G3, conveyance or transfer occurring in this instance by the evidently very powerful space-charge between P and G3. What is here dealt with is a cyclic process which, fundamentally, offers new chances in connection with amplification and wave generation as well as a varied number of other practical applications. This cyclic process with all its practical possibilities is not restricted to charging phenomena of an "insulated" plate and, in fact, it may be used also in connection with a more or less high ohmage lead for the above purposes. It is obvious that a controlling effect upon the space-charge existing between P and G3 in the schematic Figure 6 is possible; for example, by suitable auxiliary electrodes.

The cyclic process discussed by reference to Figure 6 is a partial cyclic process, inasmuch as the primary electrons touch the two electrodes taking part in the cyclic process. Figure 7, on the other hand, illustrates an arrangement in which the primary electrons impact only plate P1, whereas the secondary electrons migrate to a second plate P2. Plates P1 and P2 are connected through external circuit means suitable for the purpose hereinbefore indicated. Figure 8 shows, in an exemplified embodiment in schematic form how the plates P1 and P2 may be bombarded by electrons originating from the various sources and how to obtain, if desired, two cyclic processes. In Figure 9, for example, the electrodes forming a part in the cyclic process are associated by an oscillatory circuit. As already indicated above, the space-charge built up between the electrodes playing a role in the cyclic process may be controlled or acted upon by the aid of suitable accessory electrodes, and regeneration is also feasible. When the cyclic process is used for wave generation, the control of the primary electron current offers a simple chance for modulation. It should be emphasized again that the cyclic process is not conditioned by or dependent upon insulation of the electrodes concerned therein.

The invention may be embodied in devices in which one system controls another system. If one system utilizing the method of the invention is used to control another system, such as an electronic tube of standard operation, then, by resorting to the cyclic process, or to the method discussed by reference to Figure 5, which may be termed a "circuitous method", such grid current as may possibly arise in the controlled system could be covered by or supplied from the first system. Figure 10, for instance, illustrates such a device in which an arrangement such as shown in Figure 5 acts as the first system, the plate P of the first system controlling the grid g of the second system. In the arrangement of Figure 5, the current of grid G2 supplied all the requirements for current arising at F by secondary emission. In an organization as shown in Figure 10, the said requirement of current could be wholly or partly supplied by the grid current of the second system. In other words, grid current control by the secondary emission process in the first system may take place. This is a method which could be used also for modulation purposes in transmitter equipment. It may also be noted that the various systems or the different electrodes could be exchanged so far as their purposes are concerned. For instance, a control action by the second system upon the first system may be brought about and the grids by secondary-electron emission may make demands for electrons, while in the device of Figure 10 the plate P draws the requisite electrons.

The control of the potentials of the electrodes participating in the secondary-electron emission or of the collector electrodes associated therewith depends essentially upon the quantities of electrons concerned, as well as upon the size of the capacities subject to charge reversal. Inasmuch as the capacities involve a frequency function (frequency-response curve), it may be desirable to adapt the control slope of a tube to the particular work for which the latter is intended.

A plurality of systems as here disclosed may be connected in series or in cascade, or, if raising the current is necessary, several paralleled systems, for instance, electronic tubes or secondary-emission multipliers, could be controlled in a manner as hereinbefore disclosed. In order to minimize spurious capacitances, it is possible to work with virtual cathodes in some instances or as a general rule.

As the control of insulated plates presents points of unsteadiness or irregularity in the characteristic, it is advantageous to impart to these electrodes through high resistances a static or steady potential. These high resistances may be self-regulative electron tubes or of the glow-tube type, which will respond only when the characteristic breaks off, and which is useful, for instance, in modulation and relaxation (sawtooth) wave schemes. If the resistances are constant, or are glow-discharge paths, they should preferably be enclosed also inside the envelope of the tube. The basic idea of this invention may be used in all fields of application, amplification, regulation or control and linearization or distortion correction, rectification and also in the various fields of wave generation.

In sound-film and television work the cathode, as already pointed out, may be of the photoelectric type; in some cases a secondary-emission or a cold cathode could be used. The invention also will be found serviceable and useful in conjunction with Braun tubes and electron-ray television transmitters or electronic picture-dissectors, particularly for the voltage control of such devices. The fundamental rules and instructions of the invention are usable also for the control of a "storage" device.

Since the steepness of the characteristic or control slope of the system of this invention is largely a function of the voltage of the collector electrode, the various effects here discussed, under certain circumstances, may be increased by incorporating a resistance in the collector electrode, so that the potential of this electrode will vary at the rhythm or rate of variations in the controlled current. It is also feasible to create selective amplifiers by connecting an oscillation circuit to the collector electrode, and wave generation may be produced through one or several collector electrodes. Also modulation is possible by resistance or voltage effects in the circuit containing the collector electrode. Potential control is also obtainable by virtue of the fact that the electrodes where secondary-electron emission takes place exhibit different secondary emissivity properties at different points, and that the controlling potential influences the electronic bombardment point as a result of which a variation of potential takes place because of the fact that there are local fluctuations of secondary emission.

To lessen or eliminate the frequency function occasioned by the capacities that are present, a fixed feedback could be provided, preferably inside the envelope, by suitable formation of the electrodes.

The difficulty inherent in the attempt to fix the operating point where the slopes are very marked or steep is suitably overcome by taking the first grid bias potential off across a resistance which, for instance, may be traversed by the current of the collector electrode (cathode resistance). It will also be found convenient to derive the cathode bias potential of a controlled second system from a potentiometer traversed by the current of the first system.

Figure 11:
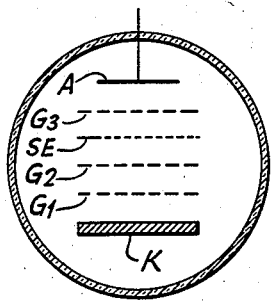

Figure 11 illustrates another feasible embodiment of the invention. The primary electrons issuing from the cathode K are supposed to generate secondary-emission electrons at the grid electrode SE, these electrons traveling on in whole or part through the grid G3 to the anode A. According to the potential prevailing between SE and G3, a larger or smaller space-charge will be built up in the space between these two grids. The current to anode A, as will thus be evident, may be regulated by the potential difference between SE and G3. If, then, in front of the secondary-emission electrode SE there is mounted a positively biased electrode, such as G2, then beside or in lieu of the control action exerted upon the space-charge density by influencing the potential difference between SE and G3, transfer of current to the said anterior electrode G2 may be brought about.

Figure 12:
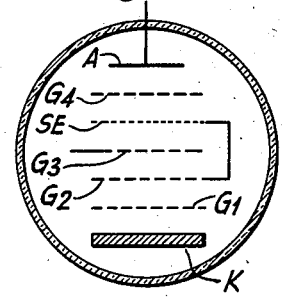
Figure 13:
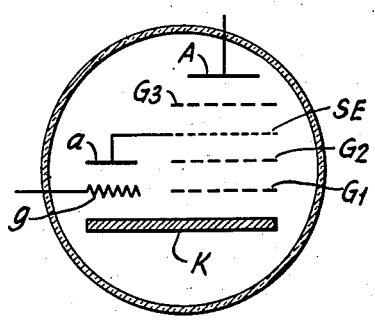

The potential difference between SE and G3 which controls the current flowing to the anode A, in turn, may be affected in various ways. The control of this potential difference may, for example, be exercised by stabilizing the potential of SE, while varying the voltage of G3, or the potential of G3 could be kept constant, while the potential of SE is varied. Moreover, both electrode potentials could be varied and controlled simultaneously. Figures 12 and 13 illustrate fundamental embodiments of a particular mode of control in which the potential of the secondary-electron emitting electrode is affected by such methods as have hereinbefore been disclosed. Referring to Figure 12, the stream of primary electrons from cathode K, for instance, is controlled by G1, and part of the stream is drawn off by G2 and fed to SE, while the other part, subject to acceleration by G3, causes secondary electron emission at SE. The incidental potential control of SE in turn results in a corresponding control of the current flowing to the anode A. Figure 13 by way of example shows that the directly supplied electron current wholly or partly controlling the potential of SE is derived from a separately or collectively controlled system K, g, a. In this connection, it may be said that as far as the control of the electrode SE is concerned, everything holds true that has been pointed out above.

Figure 14:
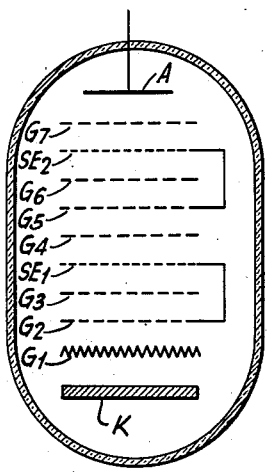

Inasmuch as the potential-controlled secondary electron emitting electrode SE becomes, according to the invention, the cathode of the controlled system next following, cascading or series connection of several such systems inside one and the same tube is practicable. Figure 14, for instance, shows an organization of two series-connected systems, each similar to that basically shown in Figure 12. The control of the various grids in such an organization may be effected jointly or separately. In the latter case, for instance, modulation or heterodyning may be effected or else recourse could be had to feedback or reflex circuit schemes.

In a general way the rule that the secondary emission will be promoted by heating the electrode operating with controlled potential, and that an additional thermionic emission may be obtained applies to potential-controlled electrodes. Both an increase in the secondary emission by heating of the potential-controlled electrode as well as additional thermionic emission of this electrode result in an increase in space-charge and thus improvement of the above-discussed control properties.

Inasmuch as special circuit layouts are preferable for tubes with potential-controlled systems, the following explanations are given as a further disclosure of applications and circuit layouts suitable for such tubes. It may be observed that in all basic circuit layouts, any desired impedances may be inserted in the circuit of the collector grid or of the screen grid; and that the potential-controlled systems may consist of any of the arrangements herein disclosed.

Figures 15 to 17 illustrates a number of fundamental circuits suitable for these tubes, and on these principles, circuit layouts for any purpose arising in practice may be made. In Figure 15 the potential-controlled control system comprises cathode K1, control grid StG1, collector grid AG, anterior grid g, and secondary-emission anode a, while the controlled system connected next above comprises cathode K2, control grid StG2, screen-grid SG, and output anode A. The collector grid AG of the control system is connected to the cathode K2 of the controlled system, and secondary emission anode a and grid g of the control system are both connected to the control grid StG2 of the controlled system. In other words, the mean potential arising on the secondary emission anode a under normal working conditions is at the same time the negative grid bias potential for the controlled or second, right-hand system of Figure 15. Care must be taken by suitable adjustment of the screen-grid and anode mutual controllance value in the controlled system so that this system will operate in the steep part of its characteristic. In Figure 15 are moreover shown the input and output resistances R$n$ and R$a$, which may be either resistors or impedances as well known in the art. Without imposing any restrictions upon general rules, Figure 15 by way of example shows the blocked cathode resistance $r_n$ for the purpose of producing the grid-filament voltage.

Figure 16 resembles Figures 15 so far as the circuit layout is concerned, but there is here no direct connection between the collector grid AG and cathode K2. On the contrary, this cathode is impressed with its own bias voltage, and it is for this purpose that the blocked cathode resistance $r2$ shown in Figure 16 is used.

In Figure 17 a coupling condenser C is provided between the potential-controlled control system and the second or controlled system connected next above. The control grid StG2 of the controlled system is impressed with biasing potential through the resistor or impedance R$g$ which is here connected in parallel with the resistance of the secondary-emission path of the potential-controlled system. In this case one common or continuous cathode could be used for both systems.

Figure 18 shows a potential-controlled system comprising K, StG2, g, a, which cooperates with a controllable system K, StG1, SG, and A. Similarly, in lieu of the control-action screen-grid systems here indicated, recourse could be had to any other tube circuit schemes known in the art.

Figure 19 shows an exemplified embodiment comprising a potential-controlled anode consisting of a photo-cathode P$h$.K, a collector grid AG, an anterior grid g, an anode a, in combination with the controlled electron tube K2, StG, SG, A, the tube being, optionally, assembled and built together to form one unit.

It will be evident that the invention is useful also in combination with push-pull arrangements; it will also be obvious that several potential-controlled systems could be disposed in series, and that standard systems could be interposed in such cascaded systems. Also such combinations could preferably be confined within one and the same vessel or tube.

All of the arrangements hereinbefore disclosed may be employed as amplifiers, wave generators or oscillators, and rectifiers (either of the plate or grid-detection type). In these organizations one system may act as an amplifier, while the second system corresponding thereto acts as a rectifier, or, in one of the systems mixing (by beat or modulator effect) of several oscillations may be brought about, and part or all of the latter may be generated in the same arrangement. Gain or volume control and, if desired, automatic volume control (A. V. C.) may be obtained in potential-controlled systems by acting upon or shifting the working point upon the potential characteristic. Also the terminal electrode of a secondary-electron emission type of multiplier may be designed to act as a potential-controlled electrode.

In some instances, adaptation of the potential-controlled system to the frequency spectrum to be handled will be necessary. In the presence of a maximum limiting frequency ω (cyclic frequency) and a capacity C whose charge is to be changed, the resistance R of the secondary-emission path of the potential-controlled system, from the known equation, is found to be $$R = \frac{1}{\omega C}$$

I claim:

1. The method of varying the voltage of an element of an electron discharge device for amplification control or electric energy storage which consists in causing said element to float in an open circuit, varying the charge on said element by bombarding said element with a primary electron stream to cause secondary electron emission from said element in a ratio greater than unity, and controlling said primary electron stream in response to variations in the charge on said element.

2. The method as defined in claim 1 which includes controlling the primary electron stream by varying in response to an impressed input voltage an electrostatic field through which the primary electron stream passes.

3. The method of varying the voltage of an insulated element of an electron discharge device which consists in causing said element to float in an open circuit, producing a stream of primary electrons, bombarding the insulated element by said stream to obtain from the element secondary electron emission in a ratio greater than unity and controlling the primary stream by variations in voltage on said element to vary the secondary electron emission from the element.

4. The method of controlling an electron discharge device responsive to voltage variations on a control member which consists in causing an insulated element to float in an open circuit, varying the voltage of the insulated element by bombardment with primary electrons to produce secondary electron emission from the element in a ratio greater than unity, controlling the primary electrons to vary the secondary electron emission from said element and thereby vary its voltage, and impressing the voltage of said element on the control member of the electron discharge device.

5. The method of varying the voltage of an electron discharge element having a ratio of secondary electron emissivity greater than unity which consists in causing said element to float in an open circuit, bombarding said element with primary electrons to cause secondary electron emission, producing in front of said element in the path of the primary electrons a space charge, and varying the space charge to control the voltage of said element.

6. The method of varying the voltage of an electron discharge element having a ratio of secondary electron emissivity greater than unity which consists in causing said element to float in an open circuit, producing a stream of primary electrons, bombarding an insulated element having a ratio of secondary electron emission greater than unity with said stream to generate a voltage on said element, collecting the secondary electrons emitted by said element, and varying the stream of primary electrons by variations in voltage on said element to vary the voltage generated on said element.

7. The method of varying the voltage of an electron discharge element having a ratio of secondary electron emissivity greater than unity which consists in causing said element to float in an open circuit, producing a stream of primary electrons, bombarding an element having a ratio of secondary electron emission greater than unity with said stream to generate a voltage on said element, collecting the secondary electrons emitted by said element, and varying the stream of primary electrons in response to the voltage generated on said element by bombardment with the primary electrons.

8. The method of voltage amplification and control of electron discharges which consists in causing said element to float in an open circuit, producing a stream of primary electrons, bombarding with said stream an element having a ratio of secondary electron emissivity greater than unity, absorbing part of said primary stream by an electrode, supplying the current requirements of said element from said electrode, and varying the stream of primary electrons to vary the voltage generated on said element.

9. An electron discharge device comprising means for producing a modulated stream of primary electrons, an insulated secondary electron emitter having a secondary electron emission greater than unity connected to float in an open circuit and positioned to be impinged upon by said modulated stream, means responsive to voltage variation on said emitter for varying the modulation of said stream and a direct electrically conductive connection to said emitter to transmit the voltage developed on said emitter to a utilization point in an open circuit.

10. An electron discharge device as defined in claim 9 including a grid electrode in front of said emitter, and means for producing a difference of potential between said electrode and said emitter.

11. An electron discharge device as defined in claim 9 including a plurality of grid electrodes mounted in front of said emitter to be passed in succession by said modulated stream of primary electrons, and means for varying the potential of some of said grid electrodes to produce a variable space charge in front of and near said emitter.

12. An electron discharge device comprising an electrode system including a cathode, control element, and an anode, a second electrode system including a cathode, an insulated secondary electron emitter having a ratio of secondary electron emission greater than unity, means for directing a modulated discharge of primary electrons from said cathode to said emitter, and connections between said emitter and said control element of said first electrode system for impressing on said control element a voltage dependent on the voltage generated on said emitter by the modulated discharge in said second electrode system.

13. An electron discharge device as defined in claim 12 including an accelerating grid electrode in the second electrode system in front of said emitter.

GÜNTHER KRAWINKEL.